United States Patent
Follis (10) Patent No.: US 9,646,355 B2
(45) Date of Patent: May 9, 2017

(54) USE OF NEAR FIELD COMMUNICATION DEVICES AS PROOF OF IDENTITY DURING ELECTRONIC SIGNATURE PROCESS

(71) Applicant: ADOBE SYSTEMS INCORPORATED, San Jose, CA (US)

(72) Inventor: Benjamin David Follis, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 36 days.

(21) Appl. No.: 14/217,893

(22) Filed: Mar. 18, 2014

(65) Prior Publication Data

US 2015/0269698 A1    Sep. 24, 2015

(51) Int. Cl.
| | |
|---|---|
| *G06F 21/00* | (2013.01) |
| *H04L 29/06* | (2006.01) |
| *G06Q 50/26* | (2012.01) |
| *G06Q 20/20* | (2012.01) |
| *H04W 74/06* | (2009.01) |
| *G06F 21/44* | (2013.01) |
| *H04B 5/00* | (2006.01) |

(52) U.S. Cl.
CPC .......... *G06Q 50/265* (2013.01); *G06Q 20/20* (2013.01); *H04B 5/0031* (2013.01)

(58) Field of Classification Search
CPC ..... G06Q 50/265; G06Q 20/20; H04B 5/0031
See application file for complete search history.

(56) References Cited

U.S. PATENT DOCUMENTS

| | | | | |
|---|---|---|---|---|
| 2013/0325728 | A1* | 12/2013 | Bialostok et al. | 705/311 |
| 2014/0025577 | A1* | 1/2014 | Lisznianski | G06Q 20/20 |
| | | | | 705/44 |
| 2015/0134561 | A1* | 5/2015 | Ashley | H04W 4/008 |
| | | | | 705/342 |

FOREIGN PATENT DOCUMENTS

CH    EP 2680617 A1 *  1/2014   .......... H04W 4/008

OTHER PUBLICATIONS

Robin Acker, Andreas Plies, Michael Massoth, Ralf S. Mayer, Torsten Wiens; "Mobile Call Authentication using Near Field Communication-based Smart Cards for Proof of Identity towards a Company"; Nov. 2013; MoMM '13: Proceedings of International Conference on Advances in Mobile Computing & Multimedia; Publisher: ACM; pp. 1-5.*

* cited by examiner

*Primary Examiner* — David Garcia Cervetti
*Assistant Examiner* — Courtney Fields
(74) *Attorney, Agent, or Firm* — Shook, Hardy & Bacon L.L.P.

(57) ABSTRACT

Electronic signatures are authenticated utilizing near field communication (NFC) devices as proof of identity. An identification service collects an identification of a NFC device associated with a signer of a contract. The identification may be utilized as an access control mechanism that enables the signer to receive, view, or sign the contract. An electronic signature associated with the signer is received. The identification of the NFC device and the electronic signature of the signer are recorded in the contract and/or audit information associated with the contract.

19 Claims, 6 Drawing Sheets

USE OF NEAR FIELD COMMUNICATION DEVICES AS PROOF OF IDENTITY DURING ELECTRONIC SIGNATURE PROCESS

BACKGROUND

With fraudulent activity on the rise, establishing a reasonable proof of identity for an electronic signature is becoming increasingly important. The sender of a document being sent for electronic signature can attempt to authenticate the signer utilizing several forms of authentication. For example, the signer may be required to have access to a particular email address, provide a copy of a government-issued identification, or a handwritten signature may be analyzed and compared to an electronic signature. Each of these forms of authentication, however, can be compromised and fraudulent activity may still occur.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention generally relate to facilitating the authentication of an electronic signature utilizing near field communication (NFC) devices as proof of identity. Utilizing an identification service, an identification of a NFC device associated with a signer of a contract is collected. The identification may further be utilized as an access control mechanism that enables the signer to receive, view, or sign the contract. An electronic signature associated with the signer is also received. The identification of the NFC device and the electronic signature of the signer are recorded in the contract and/or audit information associated with the contract. Accordingly, the NFC device provides a unique proof of identity to authenticate the electronic signature.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

An "NFC device" refers to any device or card capable of communicating a unique identification associated with the device or card that can be utilized to identify, authenticate, or verify the identity of a person. As utilized herein NFC refers to communication between an NFC device and an NFC reader when in close proximity (e.g., several inches).

An "NFC reader" refers to an NFC device or any device capable of establishing NFC communication and/or receiving NFC information from an NFC device.

A "sender" refers to a person or entity utilizing an identification service to request that one or more persons electronically sign a document.

A "signer" refers to the one or more persons being requested by the sender via the identification service to electronically sign the document. A "signer" may additionally refer to one or more persons present during the signing of the document (i.e., witnesses). The signer may further utilize the identification service as an access control mechanism to prevent others from fraudulently utilizing an electronic signature of the signer.

An "identification" refers to a unique identification (ID) assigned by the manufacturer of a consumer device or NFC card which may be accessible when NFC communication with the device or NFC card is established. The identification may be stored in a database and accessed by the identification service during collection, verification, or recording of the identification.

An "identification service" refers to an on-line service that associates the identification to the signer of the contract. The name of the signer associated with the identification may be provided by a phone company, a signature service if the name of the signer and the identification has previously been registered, or an internal device database associated with the sender or signer. An identification service may include or be associated with such a signature service.

A "signature service" refers to an on-line service that maintains information about senders, signers, and contracts, sufficient to legally enforce the contracts. A signature service may then record the identification and the electronic signature of the signer to the contract. Adobe® Echosign® is an example of such signature service. A signature service may include or be associated with an identification service.

A "contract" refers to any document that requires proof of identity or is being electronically signed by the signer. The contract may be stored in a database and accessed by the identification service to provide the contract to one or more signers or for tracking or reporting purposes. The identification service may add an identification associated with the signer to the document or audit information associated with the document to provide proof of identify of the signer and/or generate reports associated with the audit information.

As discussed previously, establishing a reasonable proof of identity for an electronic signature is becoming increasingly important. However, current forms of establishing a reasonable proof of identify for an electronic signature may easily be comprised. For example, due to many recent security breaches involving email service providers, merely requiring the signer to have access to a particular email address may no longer be an acceptable form of establishing a reasonable proof of identify as these recent security breaches have proven that email accounts may be very vulnerable to fraud. Similarly, attaching a copy of a government-issued identification at the time of signing may also be insufficient as government-issued forms of identification may easily be faked. Although analysis and comparison of a handwritten signature to an electronic signature may provide limited reasonable proof of identity, signatures are not immune to forgery.

Recently, many consumer devices (e.g., smartphones) are being equipped with NFC capability. Each consumer device is also assigned a unique ID by the manufacturer of the device which may be accessible when NFC communication with the device or an NFC reader is established. Further, these consumer devices are able to read IDs of other NFC devices. This unique ID provides an opportunity for establishing proof of identify of an electronic signer that is much less susceptible to fraud than the current forms discussed above. The unique ID may be utilized by an identification service to verify the identity of a person signing a contract or as an access control mechanism to the contract itself. The consumer devices may also communicate the ID along with an electronic signature that can be utilized for audit or tracking purposes.

Embodiments of the present invention provide, among things, authentication of an electronic signature utilizing NFC devices. As will be discussed in further detail below, an identification service may collect and record an identification of an NFC device associated with a signer to a contract. Generally, the identification service receives the identification along with an electronic signature and records them to the contract and/or audit information associated with the contract. In some embodiments, the identification service may utilize the identification as an access control mechanism prior to providing a contract to a signer or allowing the signer to view or sign the contract. In this regard, at the time of signing, the identification service may require verification of the identification which the signer provides by presenting the NFC device to an NFC reader. If the signer is known to the identification service, the identification may retrieve a stored identification of the NFC device and apply the stored identification to the contract and/or audit information associated with the contract.

Accordingly, in one aspect, an embodiment of the present invention is directed to a non-transitory computer storage medium storing computer-useable instructions that, when used by one or more computing devices, cause the one or more computing devices to perform operations. The operations include receiving an electronic signature associated with a signer of a contract. The operations also include receiving an identification of a Near Field Communication (NFC) device associated with the signer. The operations further include recording the identification of the NFC device and the electronic signature of the signer in the contract and/or audit information associated with the contract.

In another embodiment of the invention, an aspect is directed to a computer-implemented method. The method includes requiring a signer to present a particular NFC device as an access control mechanism to a contract. The method also includes receiving the access control mechanism when the signer presents the particular NFC device to an NFC reader. The method further includes, upon receiving the access control mechanism, enabling the contract to be viewed or signed by the signer. The method also includes recording, by a computing device, identification of the particular NFC device in audit information of the contract.

A further embodiment is directed to a system that includes one or more processors; and a non-transitory computer storage medium storing computer-useable instructions that, when used by the one or more processors, cause the one or more processors to: collect an identification of a Near Field Communication (NFC) device associated with a signer; after the identification of the NFC device has been collected, provide a contract to the signer; require the signer to present the NFC device to an NFC reader to verify the identification; enable the contract to be viewed or signed by the signer based on verification of the identification; and record the identification of the NFC device in audit information of the contract.

Figure 1:
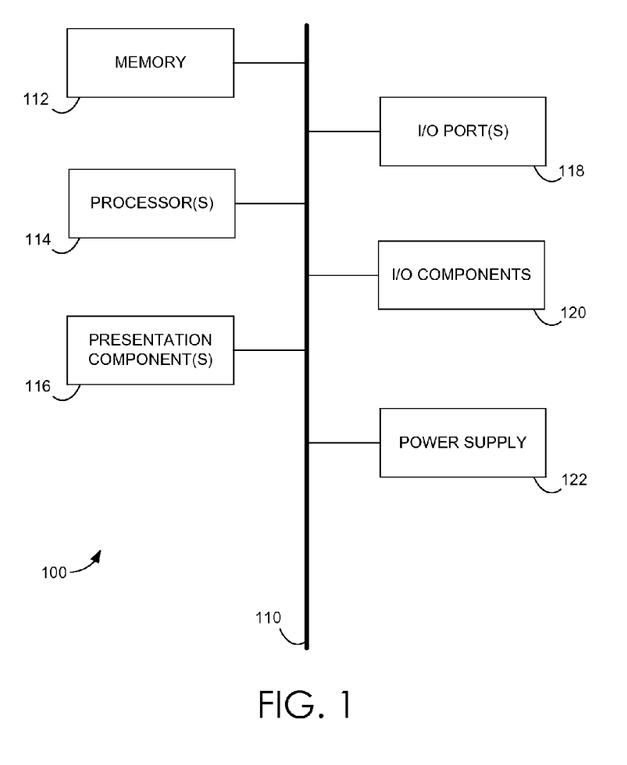
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 2:
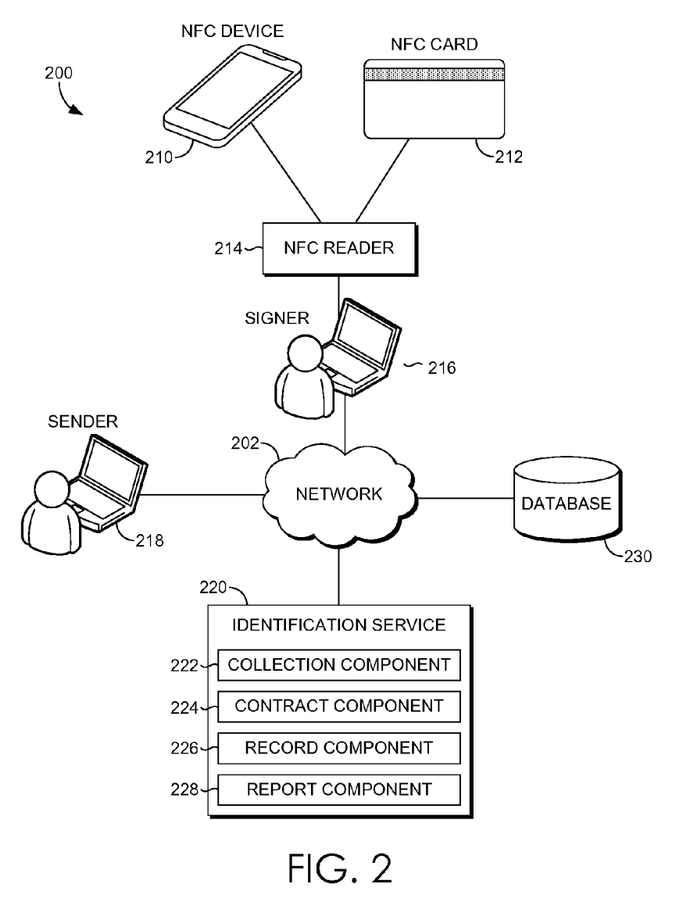
FIG. 2 is a block diagram of an exemplary system architecture in which embodiments of the invention may be employed.

Turning now to FIG. 2, a block diagram is provided illustrating an exemplary system 200 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include an NFC device 210 or NFC card 212, an NFC reader 214, a signer device 216, a sender device 218, an identification service 220, and a database 230. It should be understood that the system 200 shown in FIG. 2 is an example of one suitable computing system architecture. Each of the components shown in FIG. 2 may be implemented via any type of computing device, such as computing device 100 described with reference to FIG. 1, for example. The components may communicate with each other via a network 202, which may include, without limitation, one or more local area networks (LANs) and/or wide area networks (WANs). Such networking environments are commonplace in offices, enterprise-wide computer networks, intranets, and the Internet. It should be understood that any number of sender devices, signer devices, NFC readers, NFC devices, NFC cards, identification services, and databases may be employed within the system 200 within the scope of the present invention. Each may comprise a single device or multiple devices cooperating in a distributed environment. For instance, the identification service 220 may be provided via multiple devices arranged in a distributed environment that collectively provide the functionality described herein. Additionally, other components not shown may also be included within the network environment.

The identification service 220 may be employed by a sender or signer of a contract to assist in establishing identity, allowing the contract to be viewed or signed, and maintaining an audit trail. The sender may communicate a contract to the identification service 220 that requires an electronic signature from the signer. As shown in FIG. 2, the identification service 220 includes, among other things not shown, a collection component 222, a contract component 224, a record component 226, and a report component 228.

The collection component 222 collects an identification of a NFC device 210 or NFC card 212 associated with a signer. The identification may include a token provided by the sender to the signer. The collection component 222 may communicate with an NFC reader 214 to collect the identification of the NFC device 210 or NFC card 212. The collection component 222 may collect the identification of the NFC device 210 without requiring the NFC reader 214. For example, the NFC device 210 may be utilized to sign a contract. The NFC device provides the electronic signature of the signer as well as the identification to the identification service 220 via the collection component 222. The identification may be requested by the identification service 220, the signer, or the sender of the contract. The identification may further be stored and subsequently retrieved from storage by the identification service 220. In one example, before sending a contract to a particular signer, the sender may request that the identification service 220 collect the identification of an NFC device 210 or NFC card 212 associated with a signer. In various embodiments, the collection component 222 may collect the identification before the contract is communicated to the signer device 216 or at the time of signing.

If the signer has previously provided the identification and elected to store the identification with the identification service 220 for later use, the stored identification may be retrieved by collection component 222. The stored identification may be stored in database 230. This may allow the identification to be utilized as an access control mechanism to the contract so that only the possessor of the NFC device 210 or NFC card 212 associated with the given identification may view or sign the contract. The collection component 222 may further utilize the collection of the identification as an access control mechanism in combination with other access control methods, such as a password.

The identification may further be provided to identification service 220 by the sender, such as when the sender provides a particular NFC device 210 or NFC card 212 to the signer that must be presented to an NFC reader (such as the NFC reader 214) at the time of viewing or signing the contract. The particular NFC device 210 or NFC card 212 may have a known identification registered to the signer in a database controlled by the sender. The particular NFC device 210 or NFC card 212 may have additional identifying information the sender wishes to associate with the contract or audit information that the collection component 222 collects along with the identification.

Upon the identification of the NFC device 210 or NFC card 212 being collected by collection component 222, contract component 224 provides the contract to the signer for execution with an electronic signature. The contract component 224 may communicate the contract to the signer device 216 or to the NFC device 210 of the signer. The contract component 224 may further provide a link to the contract that the signer may only access once the collection component 222 collects the identification of the NFC device 210 or NFC card 212. The contract may be stored in database 230 such that access to view the contract is only provided when the identification has been collected or verified by collection component 222. If the signer device 216 is already in possession of the contract but in an unviewable or unsignable form, contract component 224 may enable viewing or signing of the contract so the signer may view or sign the contract on the signer device 216.

During signing of the contract, the signer may be required to present the NFC device 210 or NFC card 212 to NFC reader 214 for verification purposes. Record component 226 records the identification of the NFC device 210 or NFC card 212 in audit information of the contract. Record component 226 may further record the identification of the NFC device 210 or NFC card 212 in a visible form to the contract itself. Additional information associated with the NFC device 210 or NFC card 212, such as an electronic signature, may also be recorded by the record component 226.

Report component 228 may enable the identification service 220 to track NFC information associated with the contract. Report component 228 further enables the identification service 220 to generate reports based on the NFC information associated with the contract. The tracking information and reports may be utilized to confirm the identity of the signer, determine persons present during various stages of negotiation or at the time of signing of a contract, identify persons that have viewed or accessed the contract, and the like.

Figure 3:
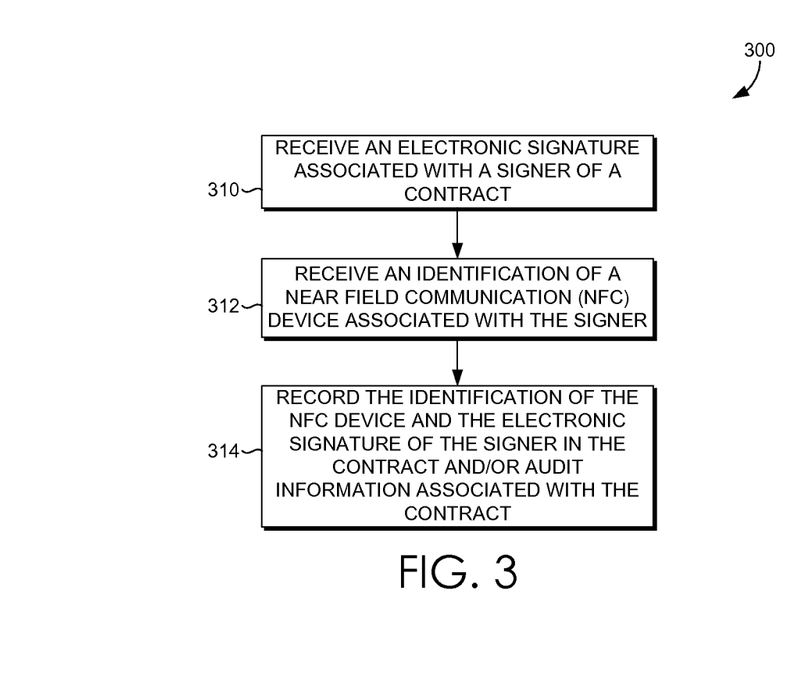
FIG. 3 is a flow diagram showing a method for recording an identification of an NFC device associated with a signer and an electronic signature in a contract, in accordance with an embodiment of the present invention.

Referring to FIG. 3, a flow diagram is provided that illustrates a method 300 for recording an identification of an NFC device associated with a signer and an electronic signature in a contract, in accordance with an embodiment of the present invention. Initially, at step 310, an electronic signature associated with a signer of a contract is received. An identification of an NFC device associated with the signer is received at step 312. The identification of the NFC device and the electronic signature of the signer are recorded, at step 314, in the contract and/or audit information associated with the contract.

In an embodiment, a collected identification is received before providing the contract to the signer. The collected identification may be based on a particular device associated with the signer. The collected identification may be verified to confirm it matches the identification received at the NFC reader. For example, a stored identification associated with a particular device for a signer may be stored by the identification service. The signer may request the identification service to store the stored identification. Rather than receiving the identification of the NFC device at the NFC reader, the signer may log in to the identification service the stored identification may automatically be applied to the contract and/or audit information associated with the contract when the electronic signature is received. The signer may also direct the identification service to require that the NFC device associated with the stored identification be presented to an NFC reader as an access control mechanism to view or sign a contract or to utilize the identification service.

In another example, the sender may have previously established the identification of the signer. The sender may direct the identification service to require the signer to present a particular NFC device associated with the signer at the NFC reader to view or sign the contract. In yet another example, the sender may provide a particular NFC device to the signer. The sender may then direct the identification service to require the signer to present the particular NFC device as an access control mechanism to view or sign the contract. The access control mechanism is received when the signer presents the particular NFC device to an NFC reader. The sender may register the particular NFC device to the signer in a database maintained by the sender or the identification service. The sender may further associate additional identifying information with the NFC device that may be recorded by the identification service during signing of the contract.

In one embodiment, the NFC information associated with a contract may be tracked by the identification service. The identification service may further be enabled to generate reports for a user of the identification service based on the tracked NFC information. These reports may identify persons that have signed, accessed, and/or modified a contract or a particular version of the contract.

Figure 4:
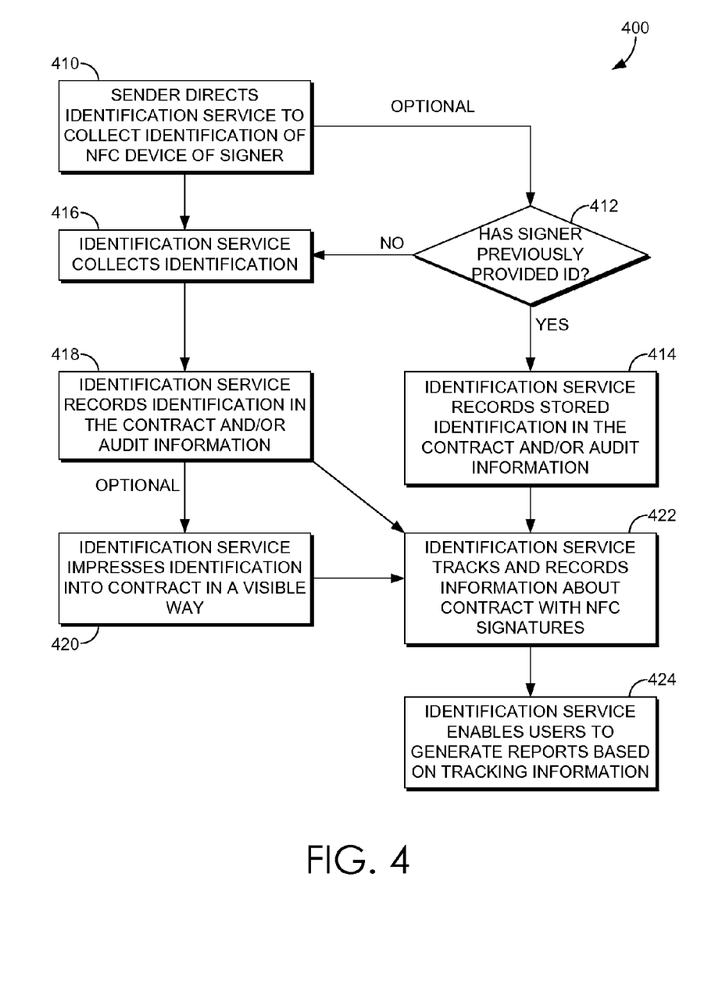
FIG. 4 is a flow diagram showing a method for an identification service collecting the identification of an NFC device associated with a signer, in accordance with an embodiment of the present invention.

Turning now to FIG. 4, a flow diagram is provided that illustrates a method 400 for an identification service collecting the identification of an NFC device associated with a signer, in accordance with embodiments of the present invention. Initially, at step 410, an identification service receives instructions to collect identification of an NFC device associated with a signer. The instructions may be received from the sender of a contract.

It may be determined, at step 412, if the signer has previously provided an identification of an NFC device (i.e., the identity of the signer has previously been verified). If the signer has previously provided identification for the NFC device, the identification service applies a stored identification to the signature flow of the contract at step 414.

If the signer has not previously provided an identification for the NFC device, the identification service collects the identification of the NFC device at step 416. The identification service further records the identification audit information associated with the contract at step 418. The identification may, at step 420, impress a visible form of the identification into the contract itself. The visible form of the identification may include additional identifying information for the NFC device, such as an electronic signature, a name, an address, and/or a phone number for the person associated with the NFC device.

At step 422, the identification service tracks and records tracking information about contracts with NFC signatures. In other words, contracts containing identification of an NFC device in the contract itself or in audit information associated with the contract may be tracked by the identification service. Tracking information may be recorded that, among other things, identifies persons signing the contract who provided an identification for NFC devices. The tracking information may further identify witnesses to the contract who provided identification for NFC devices. The tracking information may further identify parties that may have been present for specific versions or provisions of the contract and provided identification for NFC devices.

The identification service enables users, at step 424, to generate reports based on the tracking information. The users may be senders and/or signers. The users may additionally be other interested parties that have access to the identification service for a particular contract. The reports may allow the user to audit the tracking information described above.

Figure 5:
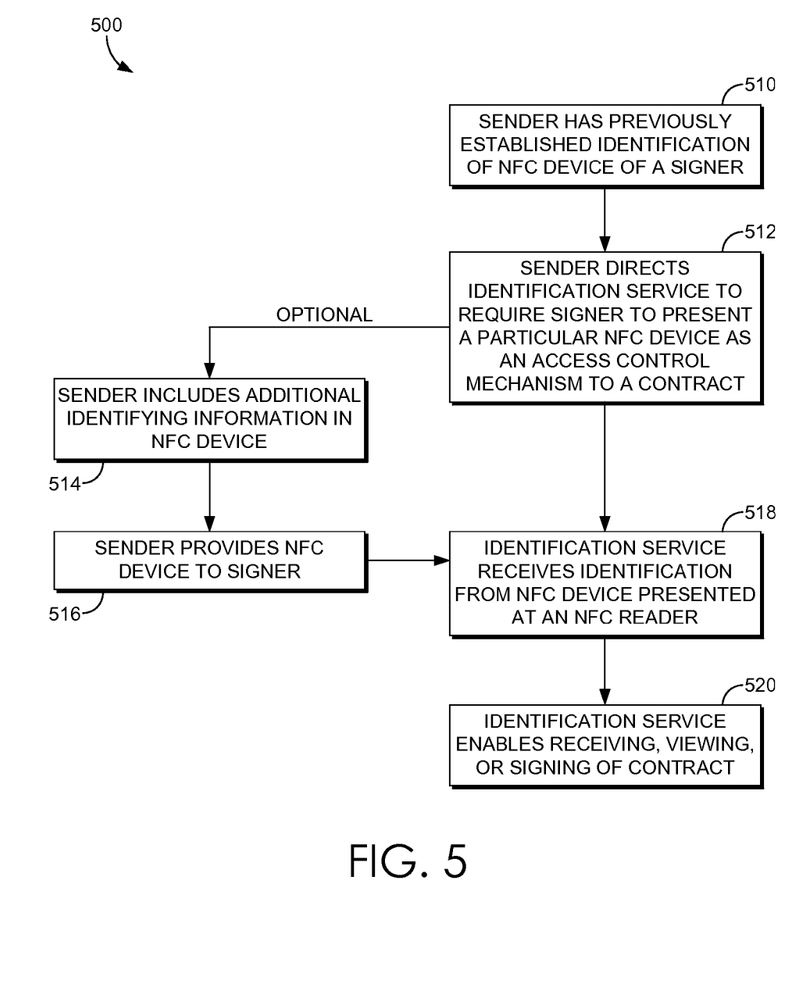
FIG. 5 is a flow diagram showing a method for enabling a contract to be viewed or signed for a signer that has previously established an NFC device with a sender, in accordance with an embodiment of the present invention.

With reference now to FIG. 5, a flow diagram is provided that illustrates a method 500 for enabling a contract to be viewed or signed for a signer that has previously established an NFC device with a sender, in accordance with embodiments of the present invention. As shown at step 510, a sender has previously established the identification of an NFC device associated with a signer. Accordingly, the sender has already authenticated that particular signer and does not need to reestablish the identification of the NFC device.

At step 512, the sender directs the identification service to require the signer to present the particular NFC device known to the sender as an access control mechanism to a contract. In one embodiment, the sender may desire to provide an NFC device to the signer that the signer must use to view or sign the contract. The sender may further include, at step 514, additional identifying information in the NFC device (e.g., an account number, a reference number maintained by the sender for that particular signer, and the like). At step 516, the sender provides the NFC device to the signer.

The identification service receives, at step 518, the identification from the NFC device when the signer presents the NFC device at an NFC reader. Once the NFC device has been properly presented, at step 520, the identification service enables the contract to be viewed or signed.

Figure 6:
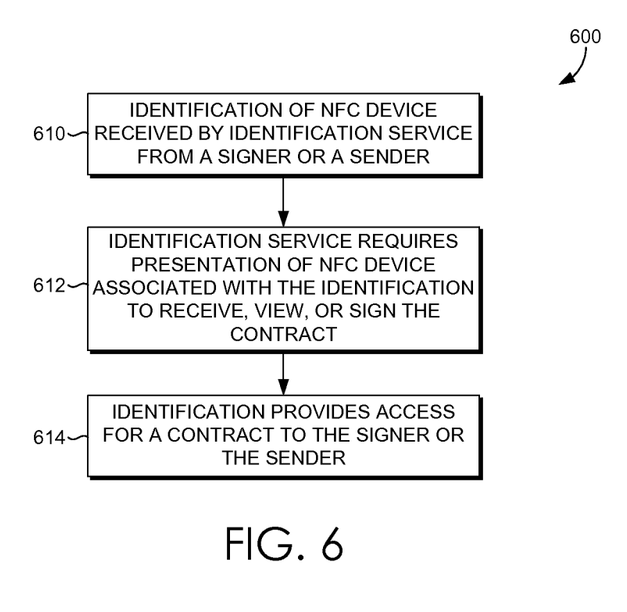
FIG. 6 is a flow diagram showing a method for utilizing an NFC device as an access control mechanism to access an identification service, in accordance with an embodiment of the present invention.

In FIG. 6, a flow diagram is provided that illustrates a method 600 for utilizing an NFC device as an access control mechanism to access an identification service in accordance with embodiments of the present invention. Initially, as shown at step 610, an identification of an NFC device is received by the identification service from a signer or a sender. Accordingly, the identification service requires presentation of the NFC device associated with the identification at step 612. Once the identification service receives the identification, access to a contract is provided, at step 614, to the signer or the sender.

As can be understood, embodiments of the present invention provide for, among other things, utilizing identification of NFC devices as proof of identify during the electronic signature process. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
   receiving, from a signer device, a Near Field Communication (NFC) device identifier for a NFC device associated with a signer of an electronic document, wherein the signer device is configured to employ a NFC reader to obtain the NFC device identifier;
   providing the electronic document to the signer device based on having received the NFC device identifier, wherein the electronic document is provided to the signer device in an unsignable form;
   enabling the provided electronic document to be signable on the signer device based on a verification that an incoming NFC device identifier, received from the signer device, matches the received NFC device identifier, wherein the signer device is configured to employ the NFC reader to obtain the incoming NFC device identifier;
   receiving, from the signer device, an electronic signature to sign the electronic document; and
   adding the NFC device identifier to the signed electronic document and/or audit information associated with the signed electronic document, to authenticate the received electronic signature.

2. The non-transitory computer storage medium of claim 1, further comprising providing the electronic document to the signer device based on having received the NFC device identifier.

3. The non-transitory computer storage medium of claim 1, further comprising superimposing a visible form of the received NFC device identifier and electronic signature onto a portion of the electronic document.

4. The non-transitory computer storage medium of claim 1, further comprising storing the received NFC device identifier for the NFC device at an identification service.

5. The non-transitory computer storage medium of claim 4, wherein the verification compares the received NFC device identifier stored at the identification service to the incoming NFC device identifier to identify the match.

6. The non-transitory computer storage medium of claim 1, further comprising:
   determining a sender of the electronic document has previously established the identification of the NFC device associated with a signer; and
   requiring the signer to present the NFC device at an NFC reader to view or sign the electronic document.

7. The non-transitory computer storage medium of claim 1, further comprising enabling the electronic document to be viewed by the signer in response to receiving the incoming NFC device identifier.

8. The non-transitory computer storage medium of claim 1, wherein the NFC device is provided to the signer by a sender of the electronic document.

9. The non-transitory computer storage medium of claim 8, wherein the NFC device is registered to the signer in a database maintained by the sender.

10. The non-transitory computer storage medium of claim 9, wherein additional identifying information is associated with the NFC device and recorded at an identification service during signing of the electronic document.

11. The non-transitory computer storage medium of claim 1, wherein a sender of the electronic document provides directions to direct an identification service to require the signer to present the particular NFC device as an access control mechanism to the electronic document.

12. The non-transitory computer storage medium of claim 1, further comprising tracking NFC information associated with the electronic document.

13. The non-transitory computer storage medium of claim 12, further comprising enabling an identification service to generate reports based on the NFC information.

14. A computer-implemented method comprising:
   sending, from a signer device, an NFC device identifier for an NFC device associated with a signer of an electronic document, wherein the signer device employs an NFC reader to obtain the NFC device identifier;
   receiving an electronic document at the signer device in response to sending the NFC device identifier, wherein the electronic document is received in an unsignable form;
   requiring a remote verification of the NFC device identifier for the NFC device as an access control mechanism to the electronic document;
   transmitting, from the signer device, the NFC device identifier for the NFC device based on a presentation of the NFC device to the NFC reader;
   accessing, on the signer device, the received electronic document based on the remote verification of the NFC device identifier for the NFC device.

15. The computer-implemented method of claim 14, wherein the sent NFC device identifier is registered in association with the signer to a database maintained by a sender of the electronic document.

16. The computer-implemented method of claim 15, further comprising sending additional identifying information associated with the NFC device based on a signing of the electronic document.

17. A system comprising:
   one or more processors; and
   a non-transitory computer storage medium storing computer-useable instructions that, when used by the one or more processors, cause the one or more processors to:
   receive, from a signer device, a Near Field Communication (NFC) device identifier for a NFC device associated with a signer of an electronic document;
   after the NFC device identifier has been received, provide the electronic document to the signer device, wherein the electronic document is provided to the signer device in an unsignable form, and wherein a subsequent receipt of the NFC device identifier from the signer device is required to verify the NFC device and enable signability of the provided electronic document;
   enable the provided electronic document to be signable on the signer device based on a verification that the subsequently-received NFC device identifier matches the received NFC device identifier; and
   add the NFC device identifier to audit information of the electronic document.

18. The system of claim 17, wherein the signer device is configured to employ an NFC reader to obtain the NFC device identifier.

19. The computer-implemented method of claim 14, wherein the instructions further cause the one or more processors to enable the provided electronic document to be viewable on the signer device based on the verification that the incoming NFC device identifier from the NFC reader matches the received NFC device identifier.

* * * * *